United States Patent
Chehaibar et al.

(10) Patent No.: US 10,601,722 B2
(45) Date of Patent: Mar. 24, 2020

(54) METHOD AND DEVICE FOR DYNAMICALLY MANAGING THE MESSAGE RETRANSMISSION DELAY ON AN INTERCONNECTION NETWORK

(71) Applicant: BULL SAS, Les Clayes-sous-Bois (FR)

(72) Inventors: Ghassan Chehaibar, Guyancourt (FR); Jean-Luc Velut, Jouy le Moutier (FR)

(73) Assignee: BULL SAS, Les Clayes-sous-Bois (FR)

( * ) Notice: Subject to any disclaimer, the term of this patent is extended or adjusted under 35 U.S.C. 154(b) by 9 days.

(21) Appl. No.: 16/156,287

(22) Filed: Oct. 10, 2018

(65) Prior Publication Data

US 2019/0109796 A1    Apr. 11, 2019

(30) Foreign Application Priority Data

Oct. 10, 2017   (FR) ...................................... 17 59459

(51) Int. Cl.
*H04L 12/26*     (2006.01)
*H04L 12/841*    (2013.01)
(Continued)

(52) U.S. Cl.
CPC ............ *H04L 47/283* (2013.01); *H04L 1/188* (2013.01); *H04L 1/1864* (2013.01); *H04L 1/1896* (2013.01); *H04L 47/18* (2013.01)

(58) Field of Classification Search
None
See application file for complete search history.

(56) References Cited

U.S. PATENT DOCUMENTS

| | | | |
|---|---|---|---|
| 6,665,308 B1* | 12/2003 | Rakib | H03M 13/256 348/E7.07 |
| 2001/0002195 A1* | 5/2001 | Fellman | H04L 12/6418 370/420 |

(Continued)

FOREIGN PATENT DOCUMENTS

| | | |
|---|---|---|
| EP | 0777363 A2 | 6/1997 |
| WO | 2004010289 A2 | 1/2004 |

OTHER PUBLICATIONS

Preliminary Search Report issued in priority French Application No. 1759459 dated Apr. 25, 2018, 3 pages.

*Primary Examiner* — Elisabeth Benoit Magloire
(74) *Attorney, Agent, or Firm* — Pearne & Gordon LLP

(57) ABSTRACT

The disclosure relates to a network interface controller for dynamically managing a retransmission delay of a message to resend the message if the retransmission delay is exceeded. The controller includes a communication module to receive an instruction for transmitting a message, said instruction including characteristic data of the message; transmission buffer memory to store the characteristic data and to associate it with a retransmission delay; a slowdown defining calculator to define a value of the division factor from said characteristic data; a reference clock to generate a fixed frequency signal; a frequency divider to generate a reduced frequency signal from the value of the division factor and the fixed frequency signal; and a reduced frequency clock associated with the transmission buffer memory to allow the retransmission delay to be timed from the reduced frequency signal and to trigger a retransmission of the message if the retransmission delay is exceeded.

13 Claims, 8 Drawing Sheets

Figure 1:
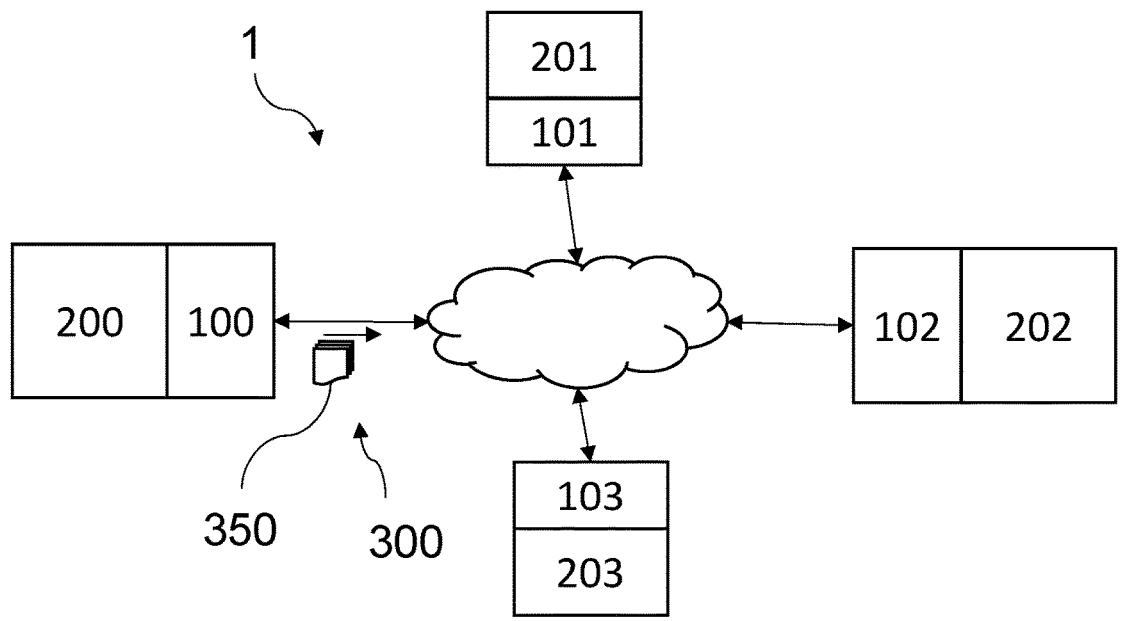

(51) Int. Cl.
  *H04L 1/18* (2006.01)
  *H04L 12/801* (2013.01)

(56) References Cited

U.S. PATENT DOCUMENTS

| | | | |
|---|---|---|---|
| 2004/0208158 A1* | 10/2004 | Fellman | H04L 12/6418 |
| | | | 370/345 |
| 2006/0039412 A1 | 2/2006 | Degenhardt et al. | |
| 2012/0039194 A1* | 2/2012 | Kure | H04N 19/30 |
| | | | 370/252 |
| 2018/0049234 A1* | 2/2018 | Lee | H04L 1/18 |

\* cited by examiner

METHOD AND DEVICE FOR DYNAMICALLY MANAGING THE MESSAGE RETRANSMISSION DELAY ON AN INTERCONNECTION NETWORK

The invention relates to the field of managing end-to-end transmission of messages on a network, and more particularly to the retransmission of messages on an interconnection network. The invention relates to a computing device for dynamically managing end-to-end transmission of messages in an interconnection network. The invention also relates to a method for dynamically managing the retransmission delay of a message within an interconnection network to compensate for a possible message loss.

PRIOR ART

In computer networks and telecommunications, computing devices send messages to each other and often must wait for a response, or an acknowledgment, before proceeding. Indeed, these messages may be lost, duplicated or corrupted and to compensate for the loss of messages, it is common that each message receives an acknowledgment. For example, when a message is sent, if after a certain time, the acknowledgment is not received then the system assumes that the message is lost and the message is then reissued. To avoid waiting indefinitely, computing devices can comprise a mechanism for defining a retransmission delay controlling the triggering of an action. For example, if no response has been received during the period of a retransmission delay, the message can be resent or the connection can be closed. The period between the receipt of the message sending instruction and the retransmission, also called the retransmission delay, is often based on the time required to receive a response (RTT for RoundTrip Time in Anglo-Saxon terminology), also corresponding to the period for sending and then receiving the acknowledgment of a message.

High Performance Computing, also known as HPC (High Performance Computing in Anglo-Saxon terminology), is developing for both academic research and industry, especially in technical fields such as aeronautics, energy, climatology and life sciences. These calculations are generally implemented on interconnection networks called clusters. The purpose of these clusters is to overcome the limitations of existing hardware by pooling resources to allow parallelized execution of instructions and disk and memory aggregation.

A cluster, also called an interconnection network, is a set of computing means (also called nodes) interconnected and exchanging messages for performing common operations. Clusters consist of a large number of nodes (typically several thousand), the latter being interconnected, for example hierarchically, by switches (typically several hundred), called switch in Anglo-Saxon terminology. The nodes correspond to a set of computer equipment that may contain computing and/or storing capacities and are for example a server, a computer, or more generally a machine.

However, the size of clusters increases day by day, these clusters must be able to process more messages at higher speeds. In general, the message transmission period has decreased, but it still varies depending on the network conditions in particular. This creates a challenge for implementing a mechanism for managing the retransmission delay on an interconnection network that can handle message losses while minimizing the number and period of the exchanges. In the context of the development of interconnection networks, it is desirable to have a low latency and a quick management of the transmission errors. The general problem is then to properly set the value of the retransmission delay for not retransmitting messages too often or not fast enough. In addition, it would be desirable to be able to integrate taking into account the size of the messages into the value of the retransmission delay.

Traditional timing mechanisms are based on retransmission delays implemented in software. Software solutions allow to achieve adaptive retransmission delays depending on parameters. Thus, the retransmission delay corresponds to the current time to which a waiting time is added and the value of the waiting time (RTO—retransmit timeout in Anglo-Saxon terminology) varies depending on the messages, generally split into packets of a same length, each packet having its own acknowledgment. For example, some documents provide an RTO equal to the RTT and then for each acknowledgment received, the RTT is calculated and a new RTO is calculated, the new RTO being a function of the sequence of the last RTTs. This type of solution is implemented in the software layers of the transport protocols. Nevertheless, this kind of calculation cannot be done simply in a network card via a hardware implementation. In addition, the implementations of such software require high computing power especially in the case of an interconnection network. This is particularly the case when using applications hosted on a node where there is, on the one hand, the consumption of part of the resources of the node and, on the other hand, dependence on the resources available on said node for managing the retransmission of the messages. This can lead to malfunctions in the interconnection network.

In recent years, using network cards that can support at least part of the message transmission/retransmission has developed. Thus, to compensate for computing resource consumption problems, some interconnection networks may have nodes equipped with network cards including several transmission and reception queues. Moving some of these functions to a dedicated hardware frees the computing power of the node for other tasks. Thus, the retransmission is managed by a hardware device on a network card without a software intervention. Nevertheless, the messages are sent in an order set by the software layer that uses the card (the card cannot reorder) and it is not possible to vary, via a hardware implementation, the waiting time so as to properly set the retransmission delay for not retransmitting messages too often or not fast enough. Conventionally, each message is added to the transmission list associated with a retransmission delay T such that T=waiting time+T of the last message in the list. A disadvantage of such methods is not to be able to take into account the characteristics of the messages while these may have an influence the RTT or not to be able to take into account the state of the network which can evolve at all time during the processing of the message.

Thus, there is a need for new devices and methods for dynamically managing message retransmission in an interconnection network where said management is carried out, via a hardware implementation, so as to address the problems caused by existing methods.

TECHNICAL PROBLEM

The invention therefore aims to overcome the disadvantages of the prior art. In particular, the object of the invention is to provide a device for dynamically managing message retransmission, said device being able to allow in particular, via a hardware implementation, to provide an adaptive retransmission able to vary depending on the characteristics of the messages such as the length of the messages to be transmitted or to take into account the congestion of the network as well as the processing time of the messages at the source and at the destination. The device must allow this management from a simple hardware implementation and without requiring complex calculations consuming resources.

The object of the invention is also to provide a method for dynamically managing message retransmission, said method allowing for an adaptive retransmission that can vary depending, in particular, on the characteristics of the messages without requiring complex calculations consuming resources.

BRIEF DESCRIPTION OF THE INVENTION

To this end, the invention relates to a network interface controller for dynamically managing a retransmission delay of a message within an interconnection network including a plurality of nodes, said network interface controller being able to resend a message if a retransmission delay of the message is exceeded, said network interface controller being characterized in that it comprises:
- a communication module able to receive, from a source node, an instruction for transmitting a message to a target node, said instruction for transmitting a message including message characteristic data,
- at least one transmission buffer memory able to store at least part of the message characteristic data and able to associate it with a retransmission delay of the message,
- a slowdown defining calculator, said slowdown defining calculator being able to define a value of the division factor from said message characteristic data,
- a reference clock able to generate a fixed frequency signal,
- at least one frequency divider, said frequency divider being able to generate a reduced frequency signal from the value of the division factor and the fixed frequency signal from the reference clock,
- at least one reduced frequency clock, said reduced frequency clock being associated with the transmission buffer memory, said reduced frequency clock being able to allow the retransmission delay to be timed from the reduced frequency signal and being able to trigger a retransmission of the message if the retransmission delay is exceeded.

Thus, the present invention allows to dynamically manage the retransmission delay of a message within an interconnection network and this via a hardware implementation carried by a network interface controller. This network interface controller allows, from a frequency divider, to vary the frequency of the clock counting down the time at one or more transmission buffer memories and therefore allows to vary the retransmission delay. Thus, instead of calculating a waiting time different for each message, it is how the time passes that is modified depending on the characteristics of the message and the messages with a transmission in progress. That is to say, the speed of the reduced frequency clock may vary depending on the characteristics of the messages in progress, the reduced frequency clock then being a variable reduced frequency clock. The higher the division factor, the more the frequency decreases and therefore time passes more slowly as controlled by the reduced frequency clock. Such a device may for example be used to manage the time of the retransmission of a message depending on the characteristics of the message to be sent. In addition, the controller is able, via hardware encoding, to fully support the management of transmissions and retransmissions of messages. Thanks to this, the nodes can focus exclusively on calculation, while communications are managed independently by the network interface controller. Thus, unlike what happens with other current network technologies, the network interface controller can provide a very high throughput even when the system is heavy computing.

According to other optional features of the controller:
when the message has been transmitted by the network interface controller, the slowdown defining calculator is configured to change the value of the division factor.

Thus, the value of the division factor is dynamic and depends in particular on the messages in progress in the list and their status. Each message contributes according to its state (transmission in progress, transmitted) and its characteristics to the definition of the value of the division factor.
the controller is able to read data to be transmitted directly into a memory of the source node and the slowdown defining calculator is configured to take into account a time for reading the data to be transmitted when defining the value of the division factor. The capacity of the network interface controller to read at least part of the content of the messages in the memory of the source node to send them to the target node allows to advantageously reduce resource consumption at the source node.
the controller includes at least eight transmission buffer memories each one being associated with a frequency divider and with a reduced frequency clock. This allows the different transmission buffer memories to be able to independently manage the retransmission delay of all the messages to be transmitted that they manage. Thus, it is possible to adjust more finely the retransmission delay of stored messages in each one of the transmission buffer memories. Preferably, the controller includes at least sixteen transmission buffer memories.
the one or more message characteristic data used by the slowdown defining calculator for defining the value of the division factor include:
the size of the message, for example measured in bytes,
the presence of data to be transmitted in the instruction,
the presence of a start address for the area to be read for the source node and/or the target node,
the presence of a descriptor table address, said descriptor table including, preferably when the data to be transmitted are on a split area, the start address and the length of each fragment on the source node and/or the target node,
the presence of a virtual addressing for the target node, and/or
the subject of the message, namely whether it is a request or a response.

These different characteristics will have an influence on the processing and/or routing time of the message and it is thus advantageous that these characteristics are taken into account when defining the value of the division factor. Preferably, the one or more characteristic data comprise at least four of these elements and more preferably the one or more characteristic data include all of these elements.

Preferably, the one or more message characteristic data used for defining the value of the division factor include the size of the message, for example measured in bytes. Thus, the controller allows to take into account the length of the messages to be transmitted in the retransmission delay.

the value of the division factor is also calculated from network characteristic values. Preferably, the characteristic values of the network are associated with the occupancy/availability rate of the network. Since the network consists of a plurality of channels that can each consist of several sections, the occupancy/availability rate of the network can be the occupancy/availability rate of a channel or a section of the channel. This allows to take into account, for establishing the division factor and therefore the retransmission time, the state of the network congestion which can occur at all time during the processing of the message and which does not depend on the characteristics of the message. In addition, taking this into account can be made possible via the hardware implementation of the network interface controller according to the invention and without requiring complex calculations, in particular thanks to the slowdown defining calculator.

the value of the division factor is also calculated from a constant, the value of said constant being such that a reduced frequency signal generated from the value of said constant and the fixed frequency signal from the reference clock, would correspond to the time required for a message to make a round trip on the empty interconnection network. This allows to establish a base period that can be changed later by the message and network characteristics.

the controller is configured so that, when the message has been transmitted, the characteristic data of the message are modified and a new division factor is calculated by the slowdown defining calculator, said new division factor being calculated from the old division factor and the new characteristic data of the transmitted message. Thus, the division factor constantly evolves depending on the load of each transmission buffer memory and the delivery progress of the messages.

the slowdown defining calculator is configured to define a new value of the division factor when the acknowledgment of the message has been received by the network interface controller. More particularly, the value of the division factor is modified so that a message, the acknowledgment of which has been received, no longer influences the value of the division factor. Thus, even more preferably, the slowdown defining calculator is configured to cancel the factor specific to the message when the acknowledgment of the message has been received by the network interface controller. Indeed, the message is complete, so it has no more influence on the frequency of the reduced frequency clock. Advantageously, considering that many messages are sent simultaneously, the acknowledgment of a message does not modify the factors of the other messages in progress.

the controller is configured so that if an instruction for transmitting a new message is received by the communication module, said instruction includes characteristic data of the new message and part of the characteristic data of the new message is stored on the transmission buffer memory, then a new value of the division factor is calculated, said new value of the division factor being calculated, by the slowdown defining calculator, from the old division factor and said characteristic data of the new message. Thus, the value of the division factor increases with the arrival of new messages. More particularly, the value is changed if the new message is managed by the same transmission buffer memory as the first message.

the retransmission delay is calculated from the current time as given by the one or more reduced frequency clocks and a constant waiting time. This allows to keep in memory the transmission or retransmission time of the message with minimum resource consumption.

According to another aspect, the present invention relates to a method for dynamically managing, by a network interface controller, a retransmission delay of a message, within an interconnection network including a plurality of nodes, so as to resend a message if a retransmission delay of the message is exceeded, said network interface controller including a communication module, a slowdown defining calculator, a reference clock, at least one transmission buffer memory, at least one frequency divider and at least one reduced frequency clock, said method including the following steps:

receiving from a source node, by the communication module, an instruction for transmitting a message to a target node, said instruction for transmitting a message including characteristic data of the message, storing, in the transmission buffer memory, at least part of the characteristic data of the message and associating said part of the characteristic data of the message with a retransmission delay of the message, defining, by the slowdown defining calculator, a value of the division factor from said characteristic data of the message; preferably, at least one of said characteristic data of the message is used for defining the value of the division factor, generating, by said frequency divider, a reduced frequency signal from the value of the division factor and the fixed frequency signal from the reference clock, and counting, by the reduced frequency clock associated with the transmission buffer memory, the retransmission delay at a frequency equal to the frequency of the reduced frequency signal and triggering a retransmission of the message if the retransmission delay is exceeded.

This method allows from a frequency divider, to vary the frequency of the clock counting down the time at the transmission buffer memory and therefore allows to vary the retransmission time of the message. Such a method may for example be used to vary the retransmission time depending on the characteristics of the message to be sent. In addition, since this does not rely on the computing capabilities of a node, the method has no detrimental impact on the resources available for calculations.

According to yet another aspect, the invention relates to a non-transitory (or a mass memory type) computer-readable medium stored with instructions which, when executed by one or more processors, causes the one or more processors to perform the method according to the invention.

Figure 2:
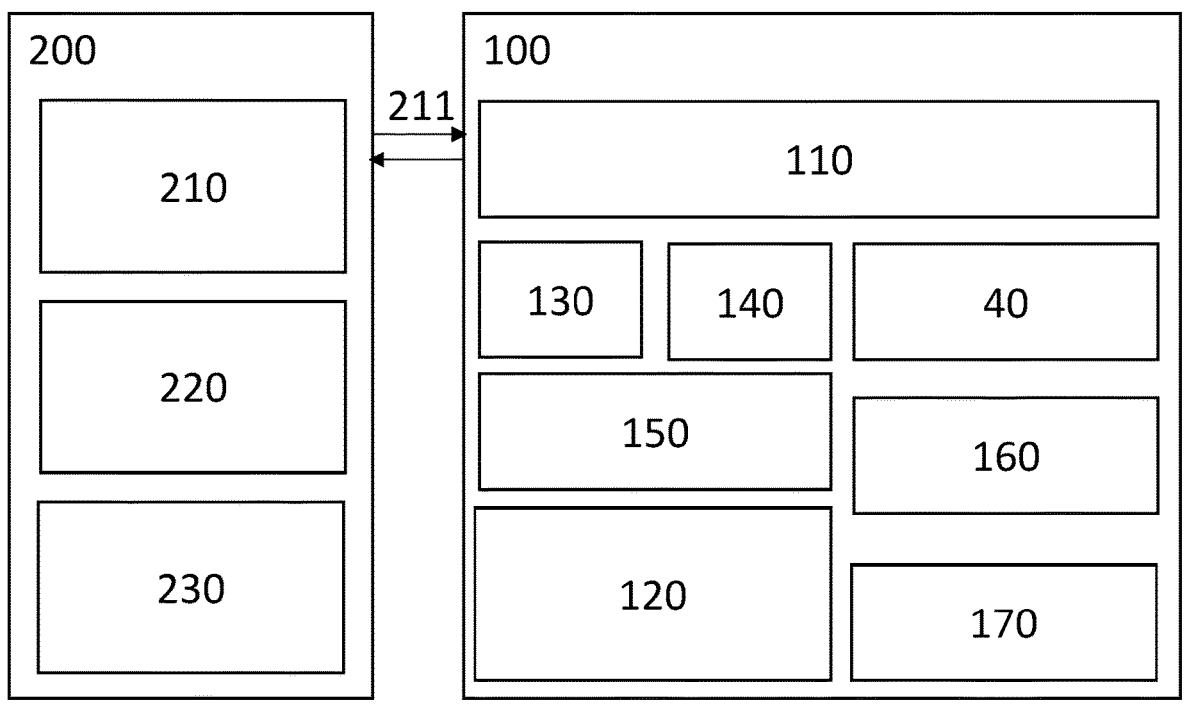
Figure 3:
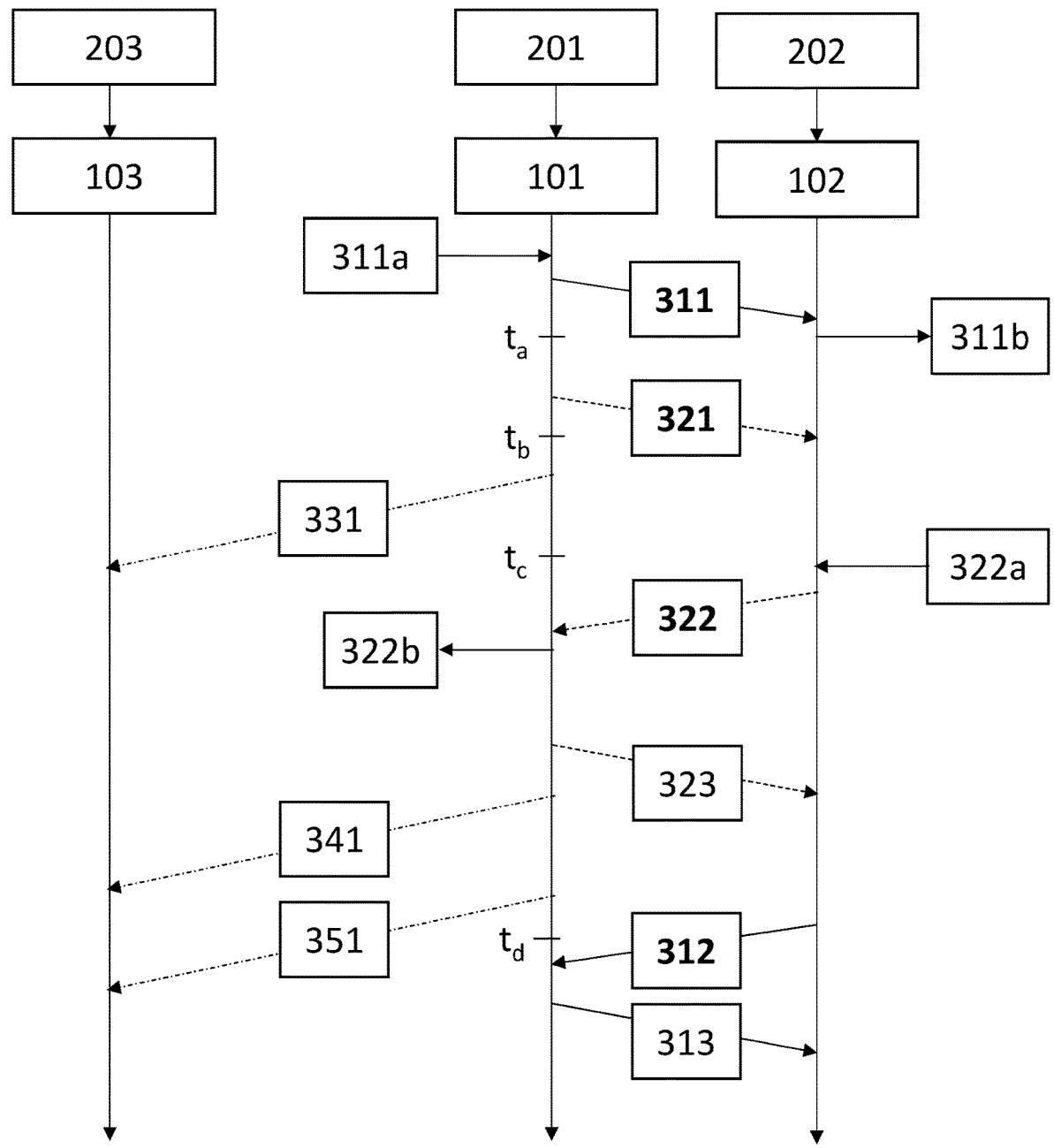
Figure 5:
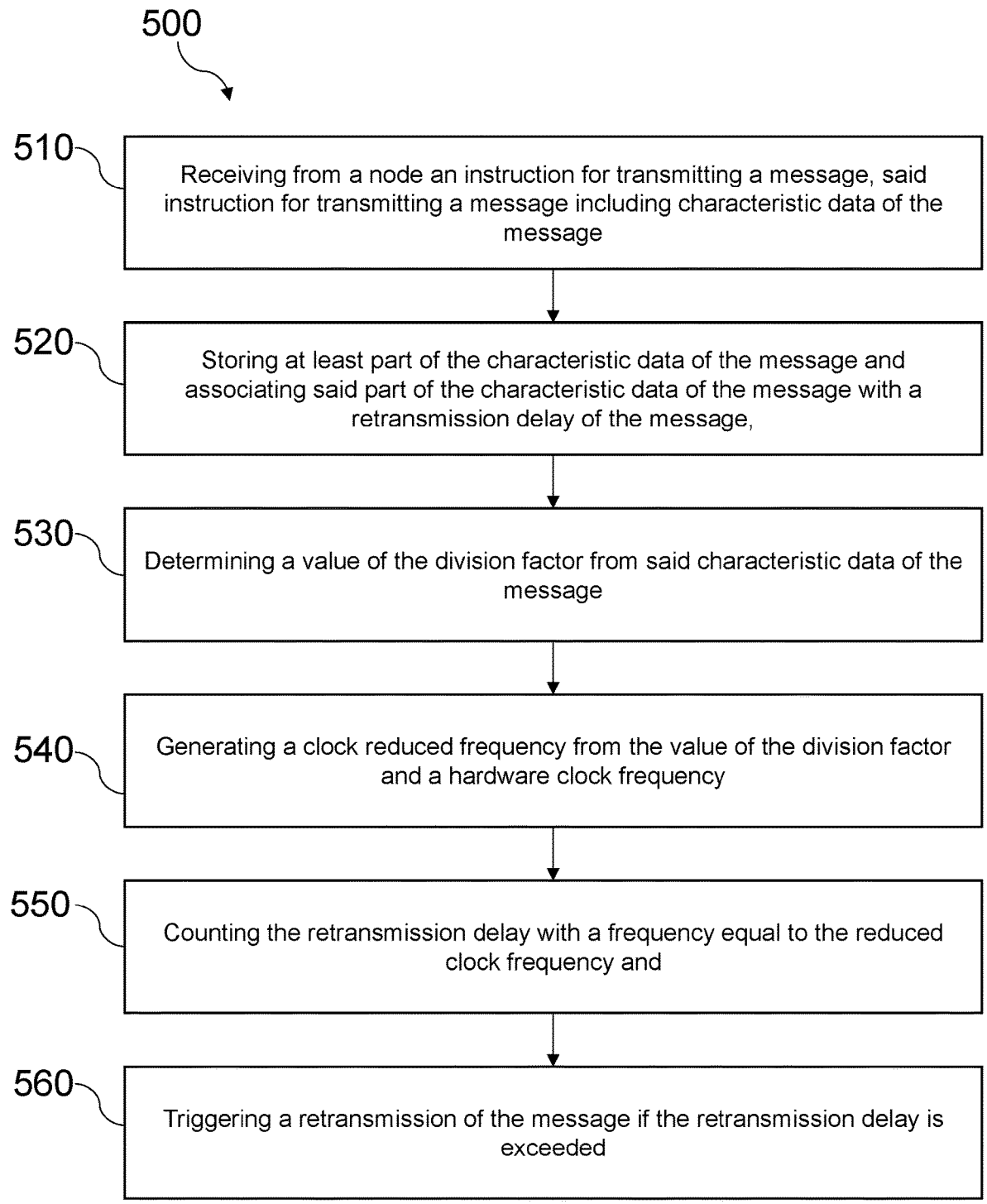
Figure 6:
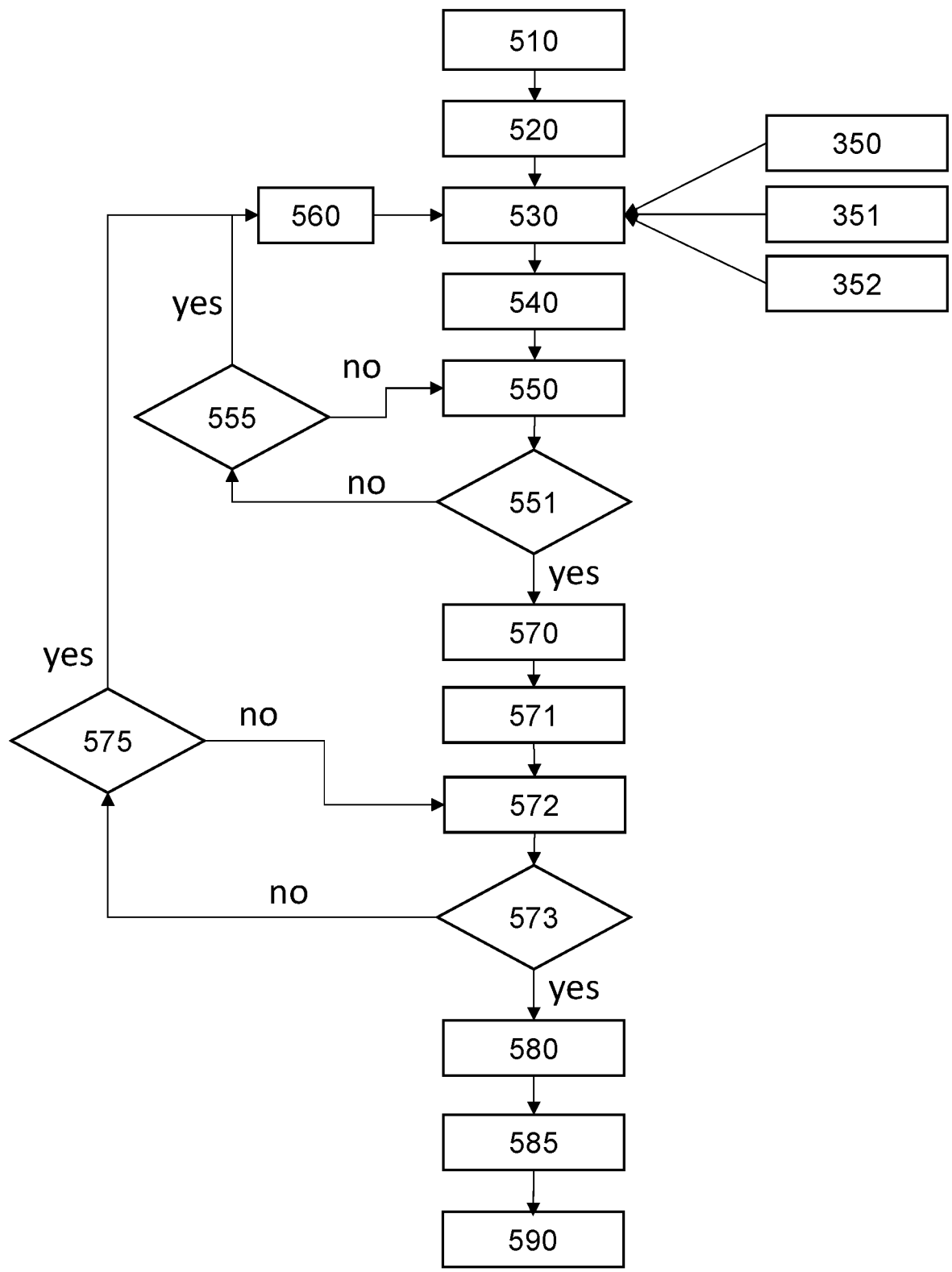
Figure 7:
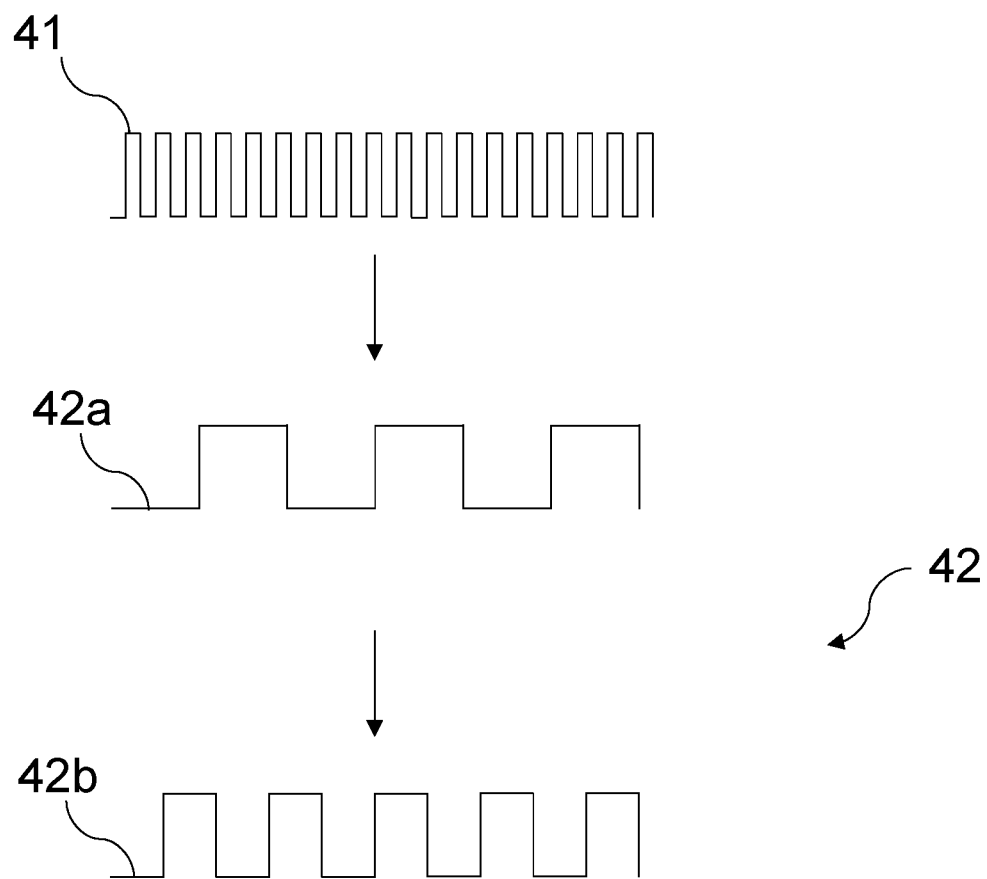
Figure 8:
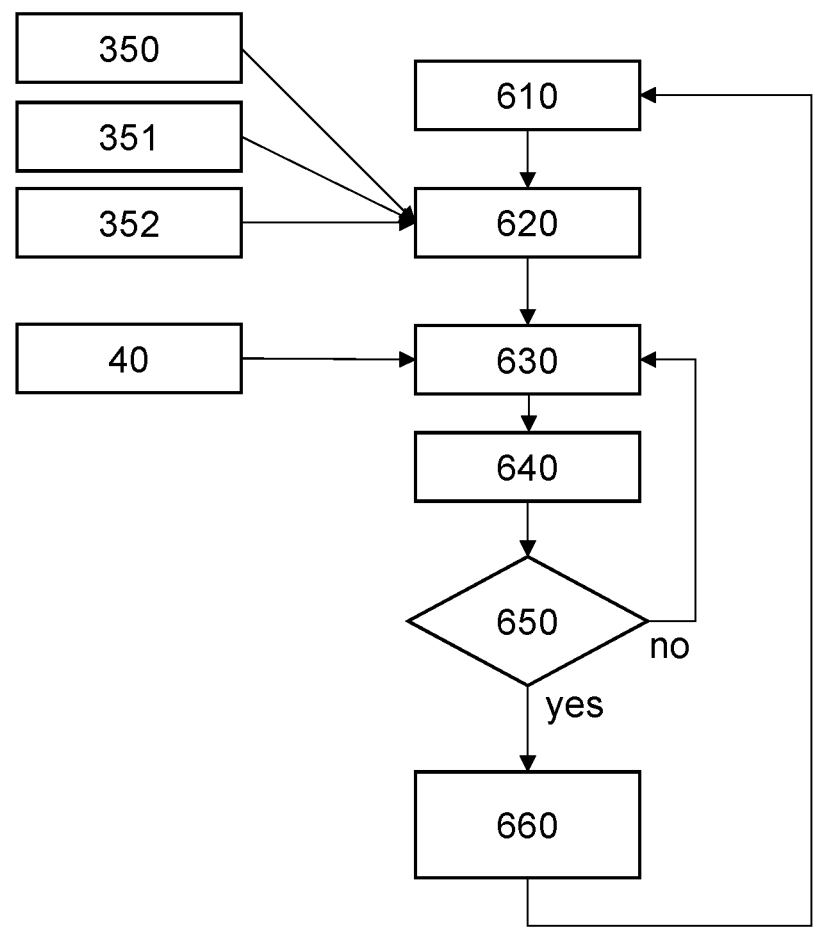

Other advantages and characteristics of the invention will appear upon reading the following description given by way of illustrative and non-limiting example, with reference to the appended figures which represent:

FIG. 1, a diagram of an interconnection network including a plurality of nodes, each node being associated with a network interface controller according to the invention;

FIG. 2, a detailed schematic diagram of a node and the network interface controller according to the associated invention;

FIG. 3, a schematic diagram of exchanges of messages over time between a source node and target nodes;

FIGS. 4A to 4D, detailed schematic diagrams of a network interface controller including according to the invention two transmission buffer memories. The various figures showing the contents of the transmission buffer memories at different times ($t_a$, $t_b$, $t_c$ and $t_d$) with reference to FIG. 3;

FIG. 5, a schematic representation of the method for dynamically managing a retransmission delay according to the invention;

FIG. 6, a flow diagram of a dynamic management of a retransmission delay according to the invention;

FIG. 7, an illustration of the fixed and reduced frequencies according to the invention;

FIG. 8, a schematic representation of the retransmission delay countdown by a reduced frequency clock according to the invention.

DESCRIPTION OF THE INVENTION

In the following description, the term "retransmission delay" means the time or the moment up until when a message can wait for the acknowledgment of receipt or acknowledgment before being considered lost. The retransmission delay can be the current time to which is added a waiting time.

The expression "waiting time" means, within the meaning of the invention, a period corresponding to the delay between taking over a message and the moment when an acknowledgment of receipt should be received.

The term "resend" means, within the meaning of the invention, that a system attempts to resend a message after the message has been considered lost because of a too long waiting time, that is to say greater than the retransmission delay, or because of a negative acknowledgment of receipt. There may be a limit to the number of times a message can be resent. For example, the number of repetitions can be limited to a maximum of six attempts.

By "interconnection network" is meant here, any dedicated computing network (such as an InfiniBand network), or more generally any collection of computer elements, especially distributed processors, with physical communication links between them.

In the following description, by "waiting list" or "transmission buffer memory" is meant, a memory where is stored the list of messages with a transmission in progress or transmitted for which an acknowledgment or an acknowledgment of receipt has not yet been received. The messages are generally placed in a waiting list or transmission buffer memory according to the order of their processing and are based on a FIFO (first in, first out in Anglo-Saxon terminology) system. Advantageously, a network interface controller according to the invention includes several waiting lists in the form of virtual containers also called transmission buffer memories. These lists can for example be assigned to a node group or to a message type.

By "acknowledgment", within the meaning of the invention, is meant a message sent by a target node following the reception of a message. Advantageously, there is only one acknowledgment per message sent.

By "coupled", within the meaning of the invention, is meant connected, directly or indirectly, with one or more intermediate elements. Two elements may be coupled mechanically, electrically or linked by a communication channel.

By "processor", within the meaning of the invention, is meant at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "executable operation", within the meaning of the invention, is meant an action performed by a device or a processor unless the context indicates otherwise. Examples of executable operations include, but are not limited to, "process", "compute", "determine", "display", "compare" or any other. In this regard, the operations relate to actions and/or processes of a data processing system, for example a computer system or a similar electronic computing device, which manipulates and transforms the data represented as physical (electronic) quantities in the memories of the computer system or other devices for storing, transmitting or displaying information.

In the following description, the same references are used to designate the same elements.

Interconnected networks typically use a short period for message error recovery delays and quickly resend when sending failed. Typically, in an interconnection network, the total delay period is short, for example, between 50 and 500 milliseconds. However, not all messages require the same period to be transmitted to the target node, thus a problem occurs for messages for which the period of the retransmission delay is too short. In an interconnection network, failure of a connection path results in an application failure that uses the failed connection path, which can lead to performance degradation.

FIG. 1 schematically shows an interconnection network 1 including a plurality of nodes 200, 201, 202, 203. The nodes 200 of the interconnection network 1 may include a communication module 210 such as a transceiver, one or more processors 220 and memory 230. Each one of the nodes is associated with a network interface controller 100, 101, 102, 103 able to send a message 300. In addition, this network interface controller 100 is able to resend a message 300 if a retransmission delay 20 of the message 300 is exceeded.

As detailed in FIG. 2, the network interface controller 100 may be a separate device or coupled to a node 200. The network interface controller 100 may be integrated in a node 200 and share resources with the node 200, such as processors 220 and memory 230. Preferably, and as illustrated, the network interface controller 100 may take the form of a device (e.g. a network card) including its own processors 160 and memory 170 (e.g., a PCIe card, a USB device or a daughter board). The network interface controller is advantageously configured to be able to build messages to be sent by reading their data in the memory of a source node, transmitting them, tracking messages in progress, receiving messages from other nodes and generating responses (e.g. reading message or writing data). Thanks to this and the other features detailed here, it allows a dynamic and efficient management of end-to-end transport with retransmission in case of a message loss.

The network interface controller 100 may include a combination of hardware and software (e.g., firmware) for providing a node 200 with a physical access to a communication channel of the interconnection network 1. The communication channel may be based on a wired or wireless connection. Each network interface controller 100 can include one or more processors 160 that can be advantageously integrated circuits of the ASIC (application-specific integrated circuit in Anglo-Saxon terminology) type and be coupled to communication libraries such as MPI (Message Passing Interface in Anglo-Saxon terminology) and PGAS (Partitioned Global Address Space in Anglo-Saxon terminology). The processors 160 may be coupled to the memory 170, which may be capable of storing computer readable instructions and data. The memory 170 of the controller 100 can store information accessible by the processors 160 comprising instructions that can be executed by the processors 160. For example, the memory 170 may comprise data that can be retrieved, manipulated or stored by processors 160. The memory 170 and the other memories described here can be any type of storage capable of storing information accessible by the processor concerned, such as a hard disk drive, a solid-state drive, a memory card, random access memory or read-only memory.

The network interface controller 100 includes a communication module 110, such as a transceiver, able to receive, from a source node 201, an instruction 211 for transmitting a message. The instructions 211 may be a set of instructions to be executed by the processors 160. The instructions may be stored in an object code format for immediate processing by a processor, or in another language supported by the network interface controller, including scripts. The transmission instructions 211 generally include characteristic data 350 of the message. These characteristic data 350 may be recovered, stored or modified by the network interface controller 100 in accordance with the instructions 211. The data may include sufficient information for identifying the relevant information in a memory of a node, such as numbers, identifiers, descriptive text, property codes, references to data stored in other memories or data that are used by a function to calculate the relevant data. The instructions will contain different data depending on their purpose. Typically, an instruction 211 for a data writing message 311 may include the following data:

- The length of the data to be read in the memory of the source node, or the size of the message, for example measured in bytes
- The position of the data to read. For example, the data may be in a contiguous area of the memory or in a split area. If it is a contiguous area, the instruction 211 will include a start address of the area whereas if it is a split area, the instruction 211 will comprise the address of a descriptor table, each element of which contains a start address of a fragment and its length (such a table is called IOVEC for vectored I/O in Anglo-Saxon terminology),
- The type of addressing in the memory. Indeed, the addressing can be physical or virtual and if it is virtual there is a risk of making page faults.
- An identifier for the target node and possibly a particular port in this node. For example, the instruction may include identifiers of the LID (Local Identifier in Anglo-Saxon terminology) type or identifiers of the GID (Global Identifier in Anglo-Saxon terminology) type consisting of a prefix and a GUID (Global unique identifiers in Anglo-Saxon terminology) port identifier,
- The position where the data must be written in the target node. As before, it can be in a contiguous or split area.

Alternatively, an instruction for a data reading message 321 may include the following data:

- The length of the data to be read in the memory of the target node,
- The position of the data to be read in the target node. As before, it can be in a contiguous or split area.
- The type of addressing in the memory. Indeed, the addressing can be physical or virtual and if it is virtual there is a risk of making page faults.
- The position where the data must be written in the source node, as before, it may be in a contiguous or split area.
- An identifier for the target node similarly to a data writing message.

A message 300 (for example, 311, 312, 321, 322, 331, 341, 351) may be any message likely to, or configured to, be sent on a communication channel of the interconnection network. The messages may, for example, include data or a request for data hosted by a target node. The messages may also include a request for application data, namely data to be generated by the target node. The messages 300 can be formatted to support a proprietary communication protocol or an industry standard protocol (e.g., IP, TCP, UDP). In addition, the controller 100 is able to send the message with only one signal at the end of the message. In addition, the controller 100 is advantageously able to receive a single acknowledgment regardless of the size of the message. This allows to save the network bandwidth by having a single response for the whole message instead of a plurality of acknowledgments corresponding to an acknowledgment for each packet of the message. Therefore, the messages 300 to be sent are cut into packets sent in a single file where only the first packet includes a routing header. For example, advantageously, only the first packet of the message 300 sent by the controller 100 includes a routing header. Indeed, the controller 100 is able to transmit the packets exclusively via a dedicated path between the source and the target following the reception by the target of the first packet. In addition, said dedicated path is closed after the target controller 100 has received the last package. Such characteristics, relating to two layers of the transmission protocols: the application level (message) and the transport level (packet), allow to optimize the network bandwidth and in particular to reduce network bandwidth consumption.

FIG. 3 represents a succession of message transmission over time between a source node 201 and two target nodes 202, 203.

The message 311 is a data writing message, designed to write on a memory of the node 202 data contained in a memory of the node 201. Thus, data have to be read 311*a* in the memory of the source node 201, transferred to the target node 202 and written 311*b* in the memory of the target node 202. When the writing is completed, the node 202 sends, via its network interface controller 102, a completion response message 312 to the source node 201. Upon receipt of the completion message 312, the source node 201 sends an acknowledgment of receipt 313 to the source node 202.

As shown in FIG. 3, in parallel with this transmission of the data writing message 311, the source node 201 sent to the same target node 202 a data reading message 321. Data have to be read 322*a* in the memory of the target node 202, transferred to the source node 201 and written 322*b* in the memory of the source node 201. Upon receipt of the response message 322 of the target node 202 to the source node 201 and after the data is written, the source node 201 sends an acknowledgment 323 to the target node 202. FIG. 3 also shows sending several messages 331, 341, 351 by the source node 201 to another target node 203.

According to an embodiment, the network interface controller 100 comprises at least one transmission buffer memory 120 able to store network data such as part of the messages to be transmitted. The network controller also includes a slowdown defining calculator 130 able to define a value 30 of the dividing factor from said characteristic data 350 of a message to be transmitted. The network controller also includes at least one frequency divider 140. The network controller also includes a clock reference 40 which can preferably provide a precision of the order of one microsecond or less. Finally, the network controller also includes at least one reduced frequency clock 150.

The invention is based in particular on the fact that instead of calculating a waiting time per message, the network interface controller uses a fixed waiting time but the speed of the clock is adapted to the messages with a transmission in progress. This clock speed is generated in particular by the at least one reduced frequency clock 150. The network interface controller 100 includes a reference clock 40 generating a signal at a fixed frequency. Advantageously, the network interface controller 100 includes one reduced frequency clock 150 per transmission buffer memory, or list of messages in progress, the frequency of which is derived from the frequency of the reference clock and a value of the division factor. The calculations can for example take the following form:

frequency of the reduced frequency clock=frequency of the reference clock/value of the division factor.

Since the division factor can be modified as a function of time, the reduced frequency clock 150 is also a variable reduced frequency clock 150.

Figure 4A:
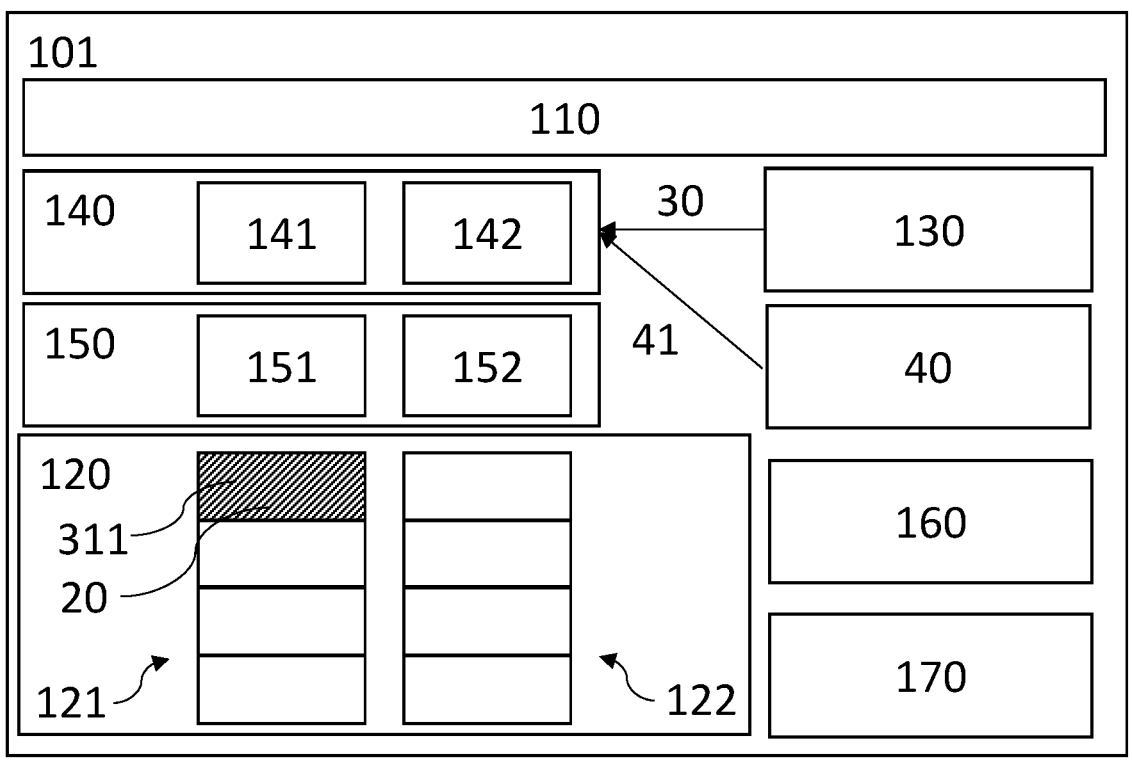

FIG. 4 represent the network interface controller and more particularly the content of the transmission buffer memories 120 as a function of the progression over time (FIG. 4A: $t_a$, FIG. 4B: $t_b$, FIG. 4C: $t_c$, FIG. 4D: $t_d$). As illustrated in FIG. 4A, the network interface controller 100 in an arrangement according to the invention can comprise two transmission buffer memories 121, 122, each one being coupled to a reduced frequency clock 151, 152 and a frequency divider 141, 142.

In FIG. 4A, the first transmission buffer memory 121, dedicated to the node 201, includes at least part of the characteristic data of the message 311 associated with a retransmission delay of the message.

Figure 4B:
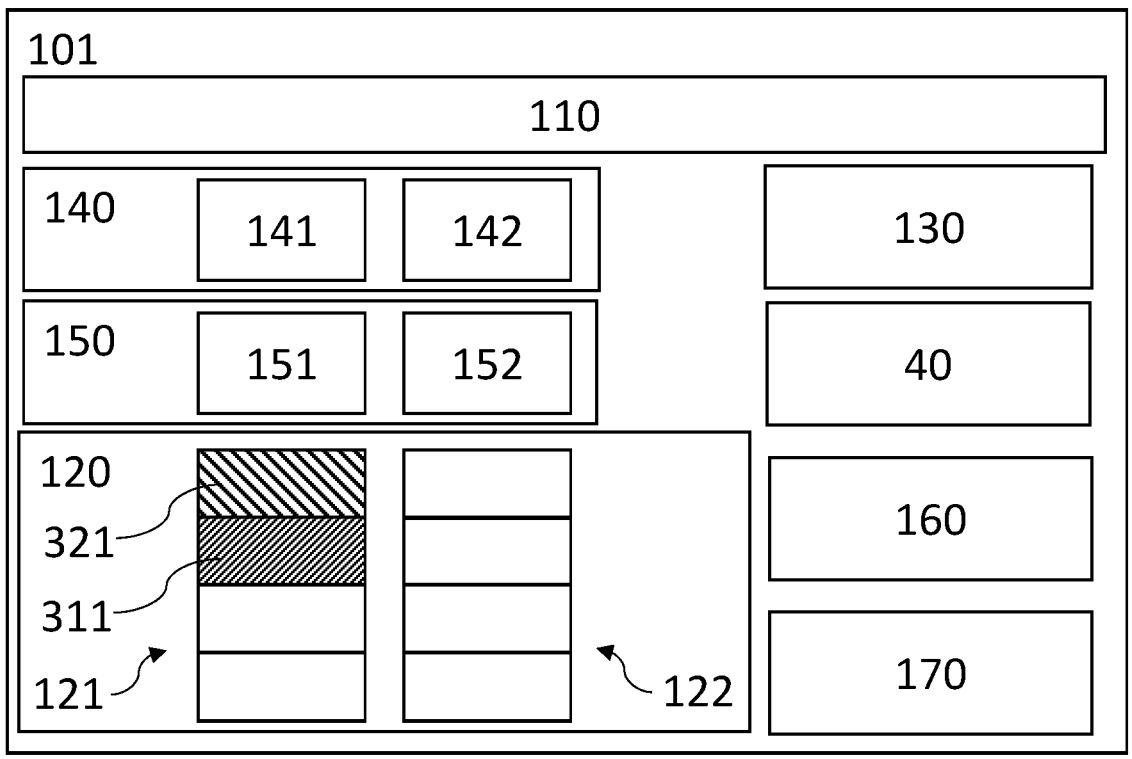

In FIG. 4B, the first transmission buffer memory 121, dedicated to the node 201, includes at least part of the characteristic data of the message 311 associated with a retransmission delay of the message 311 as well as at least part of the characteristic data of the message 321 associated with a retransmission delay 321 of the message.

Figure 4C:
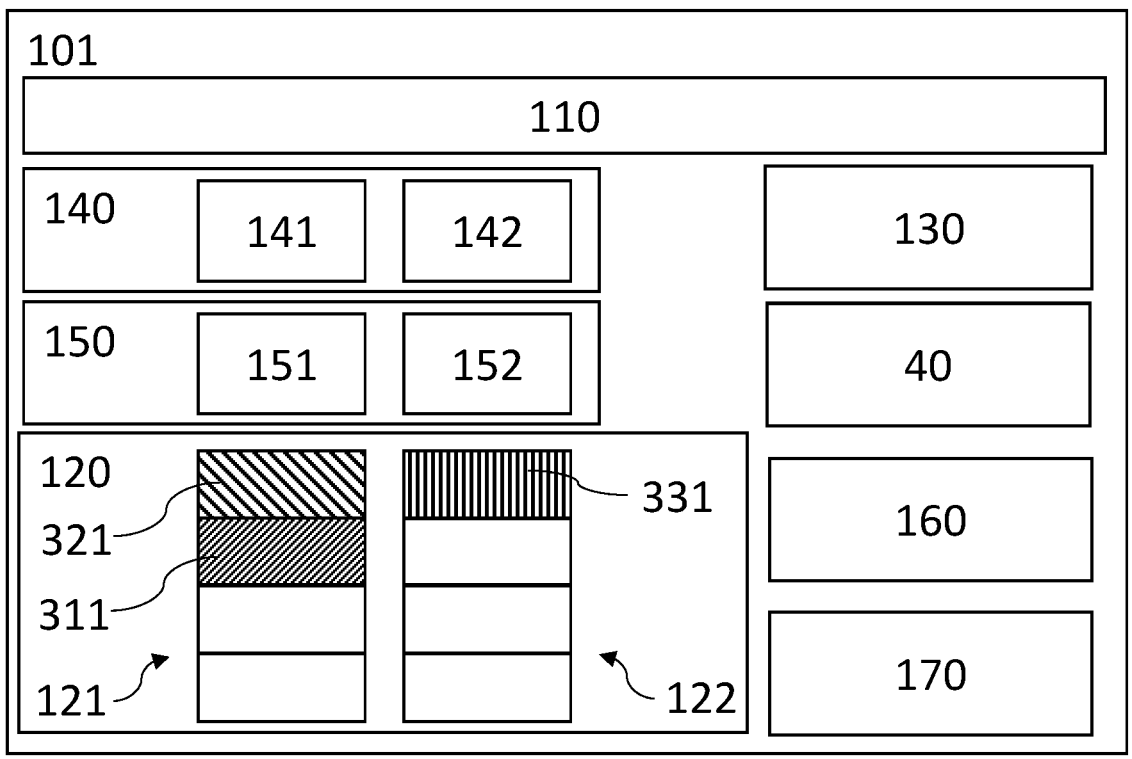

In FIG. 4C, the first transmission buffer memory 121, dedicated to the node 201, includes the same data as in FIG. 4B while the second transmission buffer 122, dedicated to the node 202, includes at least part of the characteristic data of the message 331 associated with a retransmission delay 331 of the message.

Figure 4D:
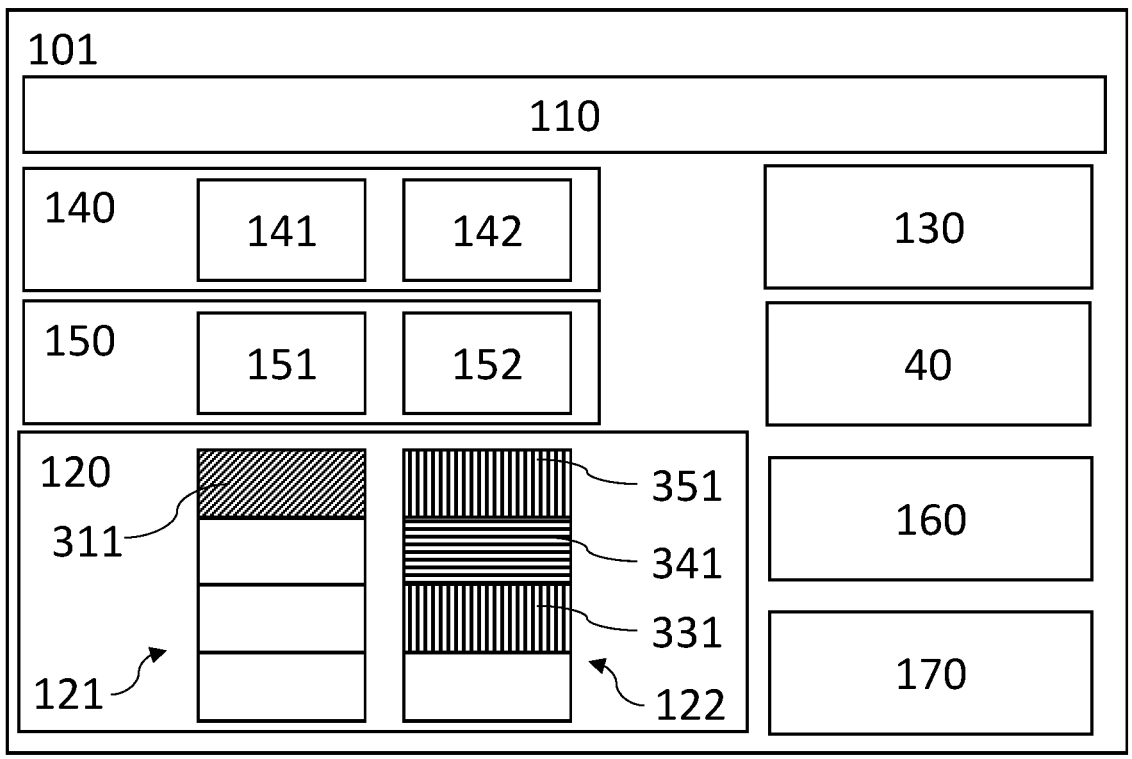

In FIG. 4D, the first transmission buffer memory 121, dedicated to the node 201, only includes at least part of the characteristic data of the message 311 associated with a retransmission delay of the message 311. Indeed, since the response 322 has been received, the at least part of the characteristic data of the message 321 has been removed from the transmission buffer memory 121. The second transmission buffer 122, dedicated to the node 202, includes, as far as it is concerned, at least part of the characteristic data of the messages 331, 341 and 351 associated with a retransmission delay of the messages 331, 341, and 351. The messages remain in their current message list, or transmission buffer memory until receiving their respective responses. When the reduced frequency clock associated with said buffer memory reaches a time greater than the retransmission delay, without having received the response, the message is retransmitted, it gets a new timestamp equal to the current time of the reduced frequency clock 150 and it is placed at the end of the list of messages in progress.

Since each transmission buffer memory is associated with a reduced frequency clock, the network interface controller 100 is able to differentially manage the retransmission delays among the transmission buffer memories. Thus, it is possible that the retransmission delays of messages stored in a transmission buffer memory are much shorter, and this as a function of the transmitted messages but also of the characteristics of the target nodes.

FIG. 5 is a schematic representation of an exemplary method 500 for dynamically managing a retransmission delay according to the invention.

FIG. 6 details this method by providing a flow diagram of a dynamic management of a retransmission delay according to the invention.

The method starts with a step 510 of receiving from a node an instruction 211 for transmitting a data writing message 311, said instruction 211 for transmitting a message including characteristic data 350 of the message 311.

Following this reception, the network interface controller 100 stores 520 at least part of the characteristic data 350 of the message 311 and associates said part of the characteristic data 350 of the message to a retransmission delay 20 of the message. This retransmission delay 20 of the message can consist of an indication of the current time to which is added a fixed waiting time. In addition, preferably, each time a message is stored in a transmission buffer memory, it is timestamped, that is to say that it is stored in association with the current value of the reference clock 40.

Next, the network interface controller 100, via a slow-down defining calculator 130, proceeds to define 530 a value of the division factor 30 from said characteristic data 350 of the message 311. As shown in FIG. 6, this determination can be made from said characteristic data 350 of the message 300 in combination with network congestion data 351 and a constant value 352.

Thus, the retransmission time of a message will depend on the characteristics of the message but also on the information of the current state of the network. For example, in some cases, sending the message does or does not require reading data on the source node. If it does, the retransmission time should depend on the length of the data but also on other factors such as data distribution areas. For this, the parameters of the message are taken into account for determining the value of the division factor. Similarly, the retransmission time of a message can be influenced by the actions or calculations to be performed on the target node In addition, the propagation time of the message from the source node to the target node must advantageously be taken into account. Indeed, it can vary greatly depending on the network congestion.

Finally, in some cases, the response to the message can be itself be subject to a retransmission delay. For example, if a message is waiting for a response being itself retransmitted, in case of exceeding the retransmission delay, more time must be allowed before retransmitting the message.

More particularly, several message characteristic data can be used for defining the value 30 of the division factor:
  the size of the message, for example measured in bytes,
  the presence of data to be transmitted in the instruction, this is the case for example for programmed Input/Output, where the instruction already includes the data to be transmitted that are small (Programmed input/output in Anglo-Saxon terminology)
  the presence of a start address for the area to be read for the source node and/or the target node. Indeed, in this case, the value of the division factor will take into account the rate of access to the memory of the source node.
  the presence of a descriptor table address including, when the data to be transmitted are on a split area, the start address and the length of each fragment for the source node and/or the target node. Indeed, in the case of split area, the value of the division factor will take into account the slowdown due to reading the descriptor array (IOVEC Vectored I/O in Anglo-Saxon terminology) and the average size of a segment as defined in the descriptor table.

the presence of a virtual addressing for the target node. Indeed, in the case of a virtual addressing, the value of the division factor will take into account the slowdown due to page faults, preferably corresponding to the time required to resolve a page fault as well as the probability of making one and the size of a page (preferably a power of 2).

the subject of the message: request or response. Indeed, in the case of a request, the value of the division factor will take into account a slowdown to be applied considering the average processing time of a request compared to a response.

Such a latitude allows in a simple way, since there is an action on only one parameter (the value of the division factor 30), to fine-tune the retransmission delay to the characteristics of the message such as the size of the message to be sent.

Advantageously, the one or more message characteristic data used for defining the division factor include the presence of a start address for the area to be read for the source node and/or the target node, and the presence of a descriptor table address including, when the data to be transmitted are on a split area, the start address and the length of each fragment for the source node and/or the target node. Thus, it is possible to take into account for establishing the division factor and therefore the retransmission delay, the processing time at the target node or at the source node. This is done via a hardware implementation and without requiring complex calculations.

Once the value of the division factor 30 is determined, the method includes a step 540 of generating a reduced frequency signal 42a from the value of the division factor 30 and a fixed frequency signal from the reference clock 40.

This reduced frequency signal 42a is used by a reduced frequency clock associated with the transmission buffer memory in which was stored at least part of the characteristic data of the message. It allows to count 550 the retransmission delay 20 at a frequency equal to the frequency of the reduced frequency signal, from the frequency divider 140.

Then, since the message 311 is a data writing message, the network interface controller 100 proceeds to a step 551 of verifying that the message 311 has been transmitted.

If the message has not been transmitted then the network interface controller 100 proceeds to a step 555 of verifying that the retransmission delay has not been exceeded. If the retransmission delay has been exceeded then the message is sent to the end of the list for triggering 560 a retransmission of the message. If the retransmission delay has not been exceeded then counting 550 continues.

When the message 311 has been transmitted by the network interface controller, the slowdown defining calculator 130 advantageously proceeds to a modification 570 of the value of the division factor. Thus, the value of the division factor is dynamic and depends in particular on the messages in progress in the list and their status. Each message contributes according to its state (transmission in progress, transmitted) and its characteristics to the definition of the value of the division factor.

Once the new value of the division factor 31 is determined, the method includes a step 571 of generating a second reduced frequency signal 42b from the new value of the division factor 31 and a fixed frequency signal from the reference clock. Then, counting 572 equivalent to counting 550 of the retransmission delay 20 at a frequency equal to the frequency of the new reduced frequency signal 42b is started.

By way of illustration, FIG. 7 represents the reference frequency 41, the first reduced frequency 42a and the second reduced frequency 42b.

The network interface controller 100 then proceeds to a step 573 of verifying that the response to the message 311 has been received. If the response has not been received then the network interface controller 100 proceeds to a step 575 of verifying that the retransmission delay has not been exceeded. If the retransmission delay has been exceeded then the message is sent to the end of the list for a new transmission. If the retransmission delay has not been exceeded then counting 572 continues.

When the response has been received by the network interface controller 100, the network interface controller proceeds to sending 580 an acknowledgment of receipt or acknowledgment message to the target node and to deleting 585 the message data from the transmission buffer memory.

Then the slowdown defining calculator 130 advantageously proceeds to a step 590 of modifying the value of the division factor. During this step, the value of the division factor is reduced. Thus, again, the value of the division factor is dynamic and depends in particular on the messages in progress in the list and their status.

In addition, the controller can be advantageously configured so that if the source node 201 is waiting for an application response then the network interface controller 100 is able to receive from the target node 202 an acknowledgment of receipt message including the application response. In that case, the time for generating the application response is taken into account when defining the value of the division factor. This allows to optimize the number of messages. Indeed, if a message is waiting for a response with application data, the acknowledgment of receipt is merged with the application response. The value of the division factor takes this into account so that the retransmission delay does not only depend on the network but also on the processing of the message at the destination node.

FIG. 8 is a schematic representation of a step of counting the retransmission delay by a reduced frequency clock according to the invention. According to one embodiment, this step can be subdivided into several substeps.

Step 610 corresponds to resetting a counter managed by a frequency divider 140 according to the invention. Step 620 corresponds to defining the value of the division factor 30. This step is equivalent to step 530 described above.

Step 630 corresponds to receiving, by the frequency divider 140, a signal of the reference clock 40 corresponding to the fixed frequency signal 41. Receiving this signal causes incrementing 640 the counter managed by the frequency divider 140.

The network interface controller then proceeds to a step 650 of comparing the value of the counter managed by the frequency divider 140 to the value of the division factor 30. If the value of the counter managed by the frequency divider 140 is greater than or equal to the value of the division factor 30 then the frequency divider 140 transmits 660 a signal to a reduced frequency clock 150 according to the invention and then the counter managed by the frequency divider 140 is reset 610.

Receiving by the reduced frequency clock 150 the signal transmitted by the frequency divider 140 allows to produce the reduced frequency 42.

The value of the division factor is dynamic. In the examples below it is noted F_msg and depends on the characteristic data of the messages 300 in progress in the list (or transmission buffer memory). Each message contributes according to its state (transmission in progress, transmitted) and its characteristics. Modifying F_msg depending on the status of the messages can be written, by way of example, according to the code shown in the table below.

TABLE 1

Illustration of calculating the value of the division factor.

| | | |
|---|---|---|
| Data writing message | Transmission in progress: | F_msg = F_msg + (L/page_size) * mem_f + (iovec ? iovec_f: 0) * L/iovec_size + (virtuel ? pf_f: 0) * L/(page_size) + req_f. |
| | Transmission completed | F_msg = F_msg – (L/page_size) * mem_f. |
| | Response received | F_msg = F-msg – (iovec ? iovec_f: 0) * L/iovec_size – (virtuel ? pf_f: 0) * L/(page_size) – req_f. |
| Data reading message | Transmission in progress: | F_msg = F_msg + req_f. |
| | Transmission completed | F_msg = F_msg + (L/page_size) * mem_f + (iovec ? iovec_f: 0) * L/iovec_size + (virtuel ? pf_f: 0) * L/(page_size). |
| | Response received | F_msg = F-msg – (L/page_size) * mem_f – (iovec ? iovec_f: 0) * L/iovec_size – (virtuel ? pf_f: 0) * L/(page_size) – req_f. |
| Response | Transmission in progress: | F_msg = F_msg + (L/page_size) * mem_f + (iovec ? iovec_f: 0) * L/iovec_size + (virtuel ? pf_f: 0) * L/(page_size) |
| | Transmission completed | F_msg = F_msg – (L/page_size) * mem_f |
| | Response received | F_msg = F-msg – (iovec ? iovec_f: 0) * L/iovec_size – (virtuel ? pf_f: 0) * L/(page_size |

With

L: Length of the message in bytes, page_size: the size of a page (e.g. power of 2), mem_f: parameter associated with the rate of access to the memory, per page, iovec?: searching for the presence or absence of an iovec, iovec_f: parameter defining the slowdown due to reading the iovecs, iovec_size: parameter associated with the average size of an iovec segment (e.g. power of 2), virtuel?: searching for the presence or absence of a virtual addressing, pf_f: parameter defining the slowdown due to page faults, advantageously pf_f depends on the time required to resolve a page fault as well as the probability of making one, page_size: the size of a page (e.g. a power of 2), and req_f: factor defining the slowdown to be applied for a request.

Thus, the network interface controller 100 according to the invention and the method for dynamically managing the retransmission delay according to the invention allow to finely adapt the retransmission time of a message according to the characteristics of the message but also other characteristics. In addition, this is possible in the absence of complex calculations and based on frequency dividers and reduced frequency clock.

All of these advantages therefore contribute to reducing the risk of loss of messages while improving the performance of an interconnection network.

The invention claimed is:

1. A network interface controller for dynamically managing a retransmission delay of a message within an interconnection network including a plurality of nodes, said network interface controller being able to resend a message when the retransmission delay of the message is exceeded, said network interface controller comprising:
    a transceiver configured to receive, from a source node, an instruction for transmitting a message to a target node, said instruction for transmitting the message including characteristic data of the message,
    at least one transmission buffer memory configured to store at least part of the characteristic data of the message and configured to associate the at least part of the characteristic data with the retransmission delay of the message,
    a slowdown defining calculator, said slowdown defining calculator being configured to define a value of a division factor from said characteristic data of the message,
    a reference clock configured to generate a fixed frequency signal,
    at least one frequency divider, said at least one frequency divider being configured to generate a reduced frequency signal from the value of the division factor and the fixed frequency signal from the reference clock,
    at least one reduced frequency clock, said at least one reduced frequency clock being associated with the at least one transmission buffer memory, said at least one reduced frequency clock being configured to allow the retransmission delay to be timed from the reduced frequency signal and being configured to trigger a retransmission of the message if the retransmission delay is exceeded.

2. The network interface controller according to claim 1 wherein, when the message has been transmitted by the network interface controller, the slowdown defining calculator is configured to change the value of the division factor.

3. The network interface controller according to claim 1, configured to read data to be transmitted directly into a memory of the source node, and the slowdown defining calculator is configured to take into account a time for reading the data to be transmitted when defining the value of the division factor.

4. The network interface controller according to claim 1, comprising at least eight transmission buffer memories, each transmission buffer memory being associated with one of the frequency dividers and with one of the reduced frequency clocks.

5. The network interface controller according to claim 1, wherein the one or more message characteristic data used, by the slowdown defining calculator, for defining the value of the division factor include:
    a size of the message,
    a presence of data to be transmitted in the instruction,
    a presence of a start address for an area to be read for the source node and/or the target node,
    a presence of a descriptor table address including when the data to be transmitted are on a split area, a start address and a length of each fragment on the source node and/or the target node,
    a presence of a virtual addressing for the target node,
    a subject of the message, and/or
    whether the message is a request or a response.

6. The network interface controller according to claim 1, wherein the one or more message characteristic data used for defining the value of the division factor include a size of the message measured in bytes.

7. The network interface controller according to claim 1, wherein the value of the division factor is also calculated from characteristic values of the interconnection network.

8. The network interface controller according to claim 1, wherein the value of the division factor is also calculated from a constant, the value of said constant being such that a reduced frequency signal generated from the value of said constant and the fixed frequency signal from the reference clock, correspond to a time required for a message to make a round trip on an empty interconnection network.

9. The network interface controller according to claim 1, wherein the network interface controller is configured so that, when the message has been transmitted, the characteristic data of the message are modified and a new division factor is calculated by the slowdown defining calculator, said new division factor being calculated from the old division factor and the modified characteristic data of the transmitted message.

10. The network interface controller according to claim 1, wherein the slowdown defining calculator is configured to define a new value of the division factor when an acknowledgment of the message has been received by the network interface controller.

11. The network interface controller according to claim 1, wherein the network interface controller is configured so that if an instruction for transmitting a new message is received by the transceiver, said instruction includes characteristic data of the new message and part of the characteristic data of the new message is stored on the at least one transmission buffer memory, then a new value of the division factor is calculated, said new value of the division factor being calculated, by the slowdown defining calculator, from the old division factor and said characteristic data of the new message.

12. The network interface controller according to claim 1, wherein the retransmission delay is calculated from a current time as given by the at least one reduced frequency clock and a constant waiting time.

13. A method for dynamically managing, by a network interface controller, a retransmission delay of a message, within an interconnection network including a plurality of nodes, so as to resend a message if the retransmission delay of the message is exceeded, said network interface controller including a transceiver, at least one transmission buffer memory, a slowdown defining calculator, a reference clock, at least one frequency divider and at least one reduced frequency clock, said method including the following steps:

receiving from a source node, by the transceiver, an instruction for transmitting a message to a target node, said instruction for transmitting the message including characteristic data of the message, storing, in the at least one transmission buffer memory, at least part of the characteristic data of the message and associating said part of the characteristic data of the message with the retransmission delay of the message, defining, by the slowdown defining calculator, a value of a division factor from said characteristic data of the message, generating, by said at least one frequency divider, a reduced frequency signal from the value of the division factor and the fixed frequency signal from the reference clock, counting, by the at least one reduced frequency clock associated with the at least one transmission buffer memory, the retransmission delay at a frequency equal to the frequency of the reduced frequency signal, and triggering a retransmission of the message if the retransmission delay is exceeded.

* * * * *